United States Patent [19]

Gamell

[11] 4,336,856
[45] Jun. 29, 1982

[54] TURBO-FLYWHEEL-POWERED VEHICLE

[75] Inventor: Joseph A. Gamell, Kalamazoo, Mich.

[73] Assignee: Joseph Gamell Industries, Inc., Kalamazoo, Mich.

[21] Appl. No.: 69,826

[22] Filed: Aug. 27, 1979

[51] Int. Cl.³ .......................... B60K 5/06; F02C 7/10
[52] U.S. Cl. ................................ 180/165; 60/39.75; 60/413; 180/65 C; 180/301; 415/90
[58] Field of Search .............. 180/301, 303, 304, 302, 180/65 C, 165; 60/338, 414, 413, 39.76, 39.75, 39.51 R; 415/90

[56] References Cited

U.S. PATENT DOCUMENTS

| | | | |
|---|---|---|---|
| 2,325,530 | 7/1943 | Meredith | 415/90 |
| 2,336,052 | 12/1943 | Anderson et al. | 180/301 |
| 2,443,770 | 6/1948 | Kasschau | 180/165 |
| 2,581,596 | 1/1952 | Nims | 180/301 |
| 2,667,744 | 2/1954 | Butler | 180/301 |
| 2,746,248 | 5/1956 | Butler | 180/301 |
| 3,498,057 | 3/1970 | Kronogard et al. | 180/301 |
| 3,771,311 | 11/1973 | Herbst | 180/301 |
| 4,157,011 | 6/1979 | Liddle | 180/301 |

*Primary Examiner*—David M. Mitchell
*Attorney, Agent, or Firm*—Gordon W. Hueschen

[57] ABSTRACT

A turbo-flywheel-powered vehicle has as the flywheel the rotor of a gas driven drag turbine, which rotor has a mass distribution such that the radius of gyration is at least 0.7 times the radius of the rotor, a combustion can for producing propellant fluid and delivering it to the drag turbine, a rotary air compressor mounted to rotate as a unit with the rotor and having conduit means for conducting compressed air to the combustion can and drive means for coupling the motor to the rolling stock of the vehicle.

4 Claims, 5 Drawing Figures

LEGEND
HX --HEAT EXCHANGER
C ---COMPRESSOR
B ---BURNER
TF --TURBINE FLYWHEEL
G/M - GENERATOR/MOTOR
M/G - MOTOR/GENERATOR
RS --ROLLING STOCK

LEGEND
HX -- HEAT EXCHANGER
C --- COMPRESSOR
B --- BURNER
TF -- TURBINE FLYWHEEL
G/M - GENERATOR/MOTOR
M/G - MOTOR/GENERATOR
RS -- ROLLING STOCK

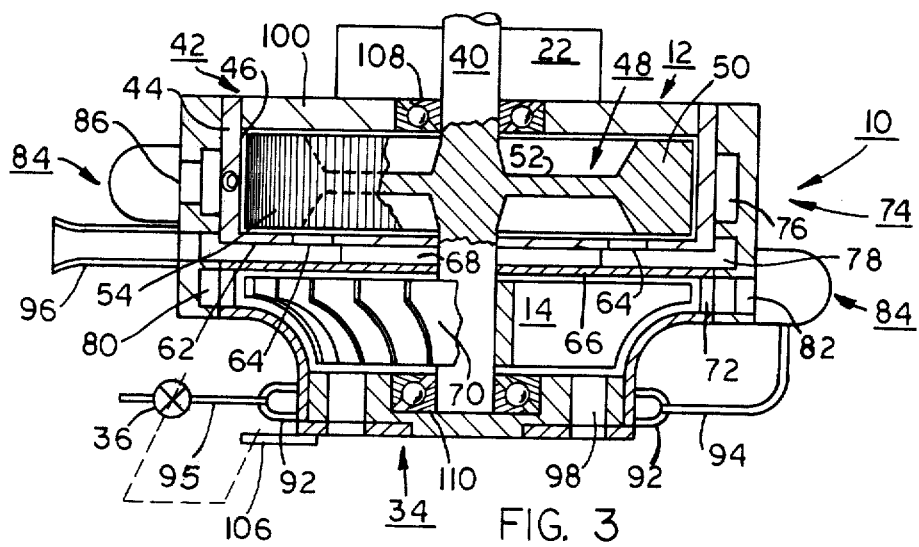
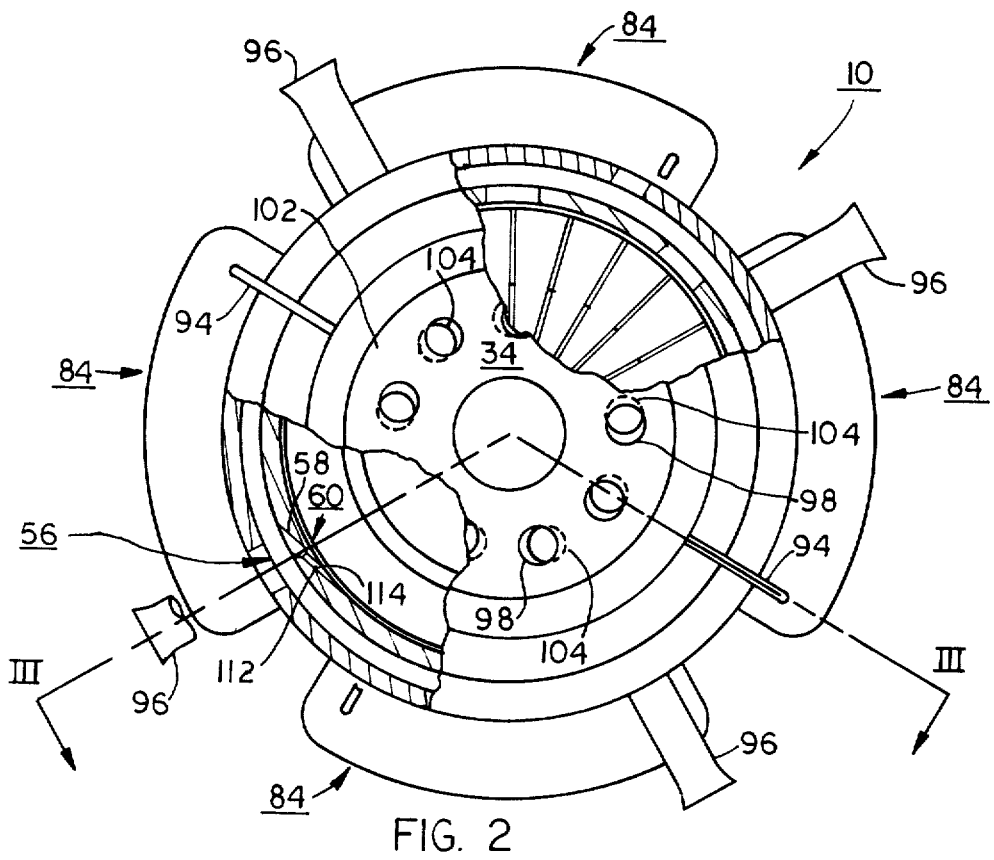
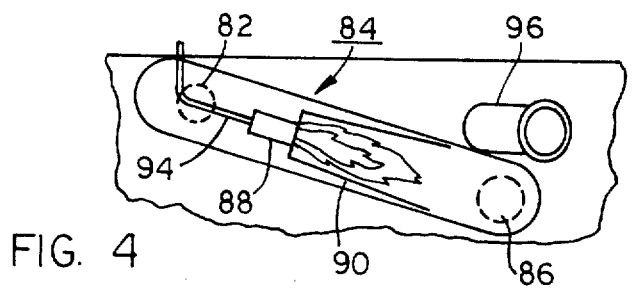

TURBO-FLYWHEEL-POWERED VEHICLE

FIELD OF THE INVENTION AND PRIOR ART

The invention relates to a turbo-flywheel-powered vehicle of the type in which energy stored in a flywheel is utilized in the propulsion of the vehicle.

Flywheel-powered vehicles have the advantage that the energy stored in the flywheel can be utilized even when the prime mover is not functioning to propel the vehicle. Thus, it has been proposed to drive a flywheel-powered vehicle by means of an electric motor coupled with a flywheel, which in turn is coupled with the rolling stock of the vehicle electrically coupled motor-generator means, one of which is driven by the flywheel and the motor and the other of which drives the rolling stock. Thus, when the motor is functioning to drive the driven motor generator, the driven motor generator functions as a generator and the drive motor generator functions as a motor. Thus, the energy from the primary motor is transferred to the rolling stock. When the primary motor is not functioning and the vehicle is moving, the drive motor-generator means functions as a generator and the driven motor generator means functions as a motor, whereby the energy of momentum of the vehicle is transferred into energy of momentum in the flywheel. When the vehicle stops, the flywheel continues to rotate so that when the circuit is closed between the two motor generator means, energy from the flywheel is transferred to the drive motor generator means to start up the vehicle. This is of particular advantage in connection with delivery vehicles which have to make repeated stops. Such devices have the disadvantage of a limited cruising range and the weight problem of batteries for driving the primary motor.

OBJECTS OF THE INVENTION

It is an object of the invention to provide an improved turbo-flywheel-powered vehicle. It is a further object of the invention to provide a turbo-flywheel-powered vehicle which avoids the disadvantages of the art. It is a further object of the invention to provide a turbo-flywheel-powered vehicle which can be driven by gasoline or like combustible material. Still a further object of the invention is to provide a turbo-flywheel-powered vehicle powered by a gas driven drag turbine in which the rotor of the turbine has a mass distribution such that functions efficiently as a flywheel. Further objects of the invention will appear as the description proceeds.

BRIEF DESCRIPTION OF THE INVENTION

The invention relates to a turbo-flywheel-powered vehicle in which the flywheel is the rotor of a gas driven drag turbine, which rotor has a mass distribution such that it functions efficiently as a flywheel and especially a radius of gyration at least as great as that of a solid cylinder, preferably at least 0.7 times the radius of the rotor.

Advantageously, the turbo-flywheel-powered vehicle of the invention comprises a combustion can for producing propellant fluid and delivering it to the drag turbine, a rotary air compressor mounted to rotate as a unit with the rotor and having conduit means for conducting compressed air to the combustion can and drive means for coupling the motor to the rolling stock of the vehicle.

In a preferred form of the invention the drive means functions to drive the motor when the combustion can is not functioning and to drive the rolling stock when the combustion can is functioning, whereby the energy of momentum of the vehicle is transferred to the rotor when the vehicle is traveling faster than the rotor and that of the rotor is transferred to the vehicle when the rotor is traveling faster than the vehicle.

Advantageously, also the drive means comprises a drive motor generator means mechanically connected with the rolling stock and electrically connected with a driven motor generator means, which is mechanically connected with and driven by the rotor.

It is of advantage also to provide throttling means for regulating the amount of combustible delivered to the combustion can and damper means for stopping the input of fluid from the combustion can to the jet orifices when the throttling means is closed, thereby permitting the rotor to free wheel. Advantageously, the damper means functions to cut off the intake of air into the compressor when the throttling means is closed.

It is of advantage also for the damper means to be coupled with braking means for braking the vehicle in such a way that when the brakes are applied, the throttling means and the damper means are closed.

In the preferred form of the invention the drag turbine is a rotor having a mass distribution such that it functions efficiently as a flywheel and a stator which has a smooth right cylindrical surface apposed to a roughened right cylindrical surface on the rotor, a plurality of jet orifices in the stator oriented to jet a propellant fluid into the space between the apposed surfaces and onto the roughened surface of the rotor, and venting means adapted to vent spent propellant fluid laterally between the orifices; a propellant fluid producing means which comprises a combustion can and a rotary air compressor which is directly driven by the rotor and mounted thereon to rotate axially therewith, delivery means for delivering compressed air from said compressor to the said combustion can, and conducting means for conducting the high pressure combustion products of the combustion can to the jet orifices; a driven motor-generator means which is driven by said rotor and which functions as a motor when an electric current is applied thereto and as a generator when it is driven; a drive motor-generator means which is mechanically connected to and drives the rolling stock of the vehicle, functions as a motor when an electric current is applied thereto and as a generator when it is driven, and is electrically connected with the driven motor-generator means, whereby when the driven motor-generator means functions as a generator, the drive motor-generator means functions as a motor and drives the rolling stock and when the drive motor-generator means functions as a generator which is driven by the rolling stock, it functions to drive the driven motor-generator means which in turn drives the rotor and stores up energy therein because of the flywheel effect thereof; throttling means for regulating the amount of combustible fed to the combustion can; and damper means for stopping the input of compressed air through said combustion can to said jet orifices when the throttling means is closed, advantageously, the latter comprising means to cut off the intake of air into the compressor.

The invention is also directed to a gas powered drag turbine as a sub-combination of the above combinations.

Advantageously, the rotor has the bulk of its mass adjacent the periphery thereof whereby the radius of gyration approaches that of a ring or annulus. It is also of advantage for the rotor to be inside the stator so that the roughened surface comprises the outer right cylindrical surface thereof and is apposed to the smooth concentric right cylindrical inner surface of the stator and in which the outermost elements of the jet orifices are tangential to the smooth surface of the stator and the lowermost elements of the orifices intercept the roughened surface, whereby a portion of the jet is jetted into the space between the apposed surfaces tangentially to the smooth surface of the stator and the balance impinges directly onto the roughened surface of the rotor.

BRIEF DESCRIPTION OF THE DRAWINGS

FIG. 2 is a bottom view of the power plant.

FIG. 3 is a side elevation taken along lines III—III of FIG. 2.

FIG. 4 is a fragmentary detailed view of FIG. 2.

DETAILED DESCRIPTION OF THE INVENTION

Figure 1:
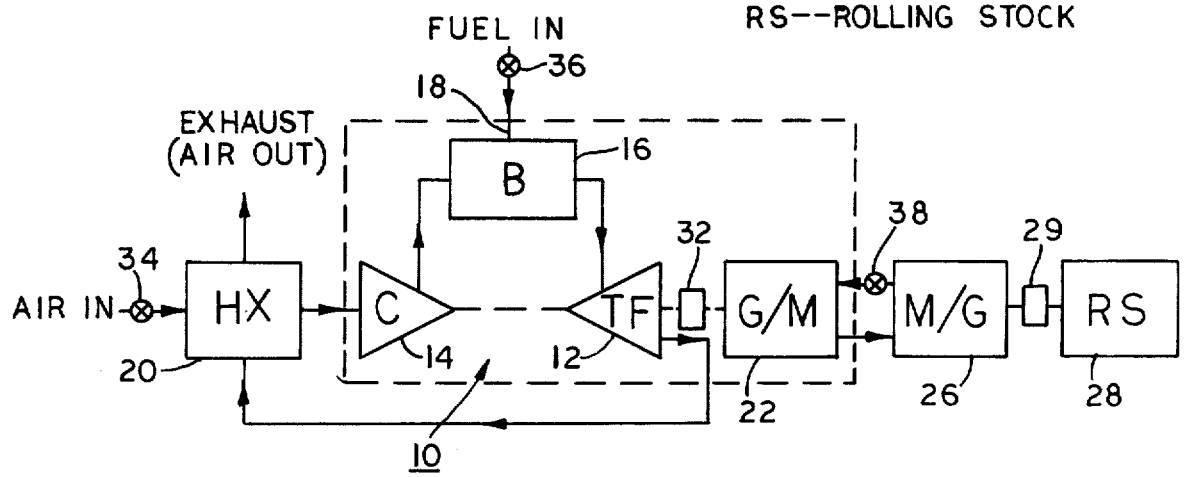
FIG. 1 is a flow sheet showing a power plant according to the invention hooked into the drive train of a motor vehicle.

In FIG. 1 a power plant according to the invention is illustrated in the block 10. This power plant comprises a drag turbine 12 directly coupled to an air compressor 14. Compressed air from the compressor 14 is fed to the burner or combustion can 16 along with fuel through the fuel intake 18. Combustion products are then fed to the turbine 12 as the propellant fluid therefor. The spent propellant fluid passes through heat exchanger 20 in heat exchange with the incoming air. The drag turbine 12 is directly connected to a motor-generator 22. The power plant 10 is mounted in a motor vehicle 24, preferably in a central location where the flywheel effect can also function to stabilize the vehicle and keep it from turning over. For this purpose, the axis of the power plant 10 is vertical.

Figure 5:
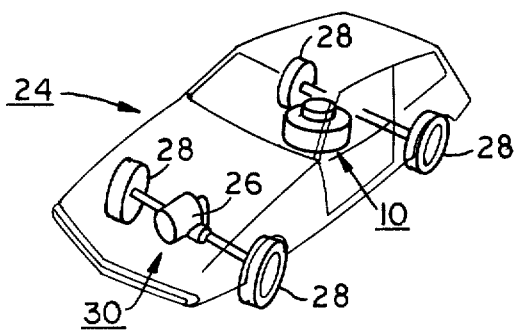
FIG. 5 is a stylized view of a motor vehicle embodying the power plant of FIGS. 2, 3 and 4.

The driven motor-generator 22 is electrically connected to a drive motor-generator 26, which in turn is connected directly and mechanically to the rolling stock 28. The drive motor-generator 26 is mounted on a transaxle as shown at 30 in FIG. 5, but, if desired, a separate drive motor-generator can be provided for each front wheel or for all four wheels, if desired.

The driven motor-generator 22 functions as a generator when it is driven, and the drive motor-generator 26 functions as a motor when current is supplied thereto from the driven motor-generator 22. Thus, as long as the power plant 10 is functioning, the rolling stock 28 will be driven by the motor-generator 26 functioning as a motor.

It will be understood that suitable transmission 29 can be provided, if desired, between the motor-generator 26 and the rolling stock 28.

When the power plant 10 is not functioning as a power plant, and the vehicle is traveling, the rolling stock then will drive the motor-generator 26, which will then function as a generator, which in turn will then drive the driven motor-generator 22, which is then functioning as a motor. Thus, the rotor of the drag turbine 12 is rotated by the motor-generator 22 and functions solely as a flywheel.

If desired, a clutch or clutch transmission 32 can be provided in the direct connection between the drag turbine 12 and the driven motor-generator 22 for the purpose of disconnecting the two and allowing the rotor of the drag turbine 12 to rotate freely when the vehicle is stopped. Then, by releasing the clutch 32, the motor vehicle can be started up slowly as the result of the energy stored in the flywheel-rotor of the drag turbine 12.

Advantageously, a damper 34 is provided in the air inline to cut off the flow of compressed air to the drag turbine 12 when the combustion can 16 is not functioning. This damper can be provided anywhere in the flow line prior to the entry into the drag turbine 12. It advantageously is in the air intake to the compressor 14.

A throttling valve 36 is provided in the fuel input for the purpose of regulating the output of combustion products and for the purpose of cutting off fuel supply completely to the combustion can 16. Advantageously, the throttling valve 36 is coupled with the damper 34 so that when the throttling valve 36 is closed, the damper 34 is also closed.

In lieu of the clutch 32, there may be provided a cutoff switch 38 in the electrical connection between the driven motor-generator 22 and the drive motor-generator 26. This effectively decouples the two motor-generators and allows the driven generator 22 to freewheel along with the rotor of the drag turbine 12. The air compressor 14 also contributes to the flywheel effect. Thus, when the power plant is freewheeling, including the driven motor-generator 22, a flywheel effect is obtained, not only from the rotor of the drag turbine 12 but also from the driven motor-generator 22 and the air compressor 14.

Referring now to FIGS. 2, 3 and 4, there is illustrated a power plant 10, in accordance with the invention, comprising a drag turbine 12, a rotary air compressor 14 and a driven motor-generator 22, all mounted on a common vertical axis 40.

The drag turbine 12 comprises a housing 42 having an outer annular wall 44, having a smooth inner surface which is right cylindrical in shape. Mounted on the axis 40 is a rotor 48, which has the bulk of its mass concentrated in an annulus 50 at the periphery in order to give the rotor a high radius of gyration so that it functions well as a flywheel. The annulus 50 is connected to the axle 40 by a web or spokes 52. If the web 52 were as wide as the annulus 40, the rotor would be a solid right cylinder, the radius of gyration of which would be 0.7 times the radius of the rotor. While the rotor may have other shapes, see for example, the various types of flywheels used in flywheel-powered vehicles disclosed in *Mechanical Engineering*, Feb. 1978, pp. 39–45, it is desirable that it have a radius of gyration of 0.7 times the radius or greater, and preferably that it have its mass concentrated in an annulus adjacent periphery of the rotor as shown in FIG. 3. In any case, the outer surface of the rotor is machined as a right cylindrical surface which is concentric with the smooth inner surface 46 of the housing 42. The outer surface of the rotor is roughened as shown at 54 by knurrling it or otherwise to enhance the drag effect.

The drag effect is obtained by jetting a propellant gas into the space between the apposed surfaces of the rotor and the housing through jet orifices 56, comprising an enlarged portion 58 and a nozzle 60. A plurality of the jet orifices 56, which are located in the outer wall 44, are spaced about the periphery of the housing. One is shown in FIG. 2, but it is understood that at least four are provided and that more may be provided according to the diameter of the outer wall 44 of the housing 42. Advantageously, a jet orifice is provided every twenty to thirty degrees or so.

The bottom side 62 of the housing 42 is imperforate except for apertures 64 and is spaced from the rotor 48 to allow spent propellant gases to flow down and across to the apertures 64.

Spaced from the apertures 64 is the upper wall 66 of the air compressor 14. A suitable spacer 68 can be provided if desired. The space between the two walls forms a channel through which the spent propellant gas exits.

The air compressor 14 has vanes 70 which are shaped in accordance with practices already known in the art to sweep the air by centrifugal force into an annular channel 72, the outer periphery of which is coincident with the outer periphery of the outer wall 44. Fastened to the outer periphery is a multiple manifold 74, having an annular channel 76 coincident with the jet orifices 56, an annular channel 78 coincident with the space between the walls 62 and 68, and an annular channel 80 coincident with the annular outlet 72 of the air compressor, thereby providing a manifold for conducting combustion products to the jet orifices, another manifold for conducting spent propellant fluid from the power plant, and another manifold for conducting compressed air away from the compressor. The compressed air manifold 80 communicates through apertures 82 with combustion cans 84. In turn, the combustion cans 84 communicate through apertures 86 with the manifold 76, whereby combustion products from the combustion cans 84 are conducted to the jet orifices 56. In FIG. 4, there is shown a stylized form of the combustion can 84 consisting of a fuel inlet line 94, a combustion head 88, and an air distribution cone 90. Details of the combustion can 84 are not shown as they are well known in the art. See, for example, *Aircraft Gas Turbine Engine Technology* by Erwin E. Treager, McGraw-Hill Book Company, especially on page 112. It will thus be understood that the air distribution cone 90 has apertures in it through which compressed air is supplied for combustion.

The fuel inlet line 94 leads to an annular manifold 92 fastened to the bottom of the air compressor 14. At dual points about the periphery of the manifold fuel lines 94 lead to the combustion cans 84. The throttling valve 36 advantageously is in the fuel inline 95. If desired, however, a separate throttling valve 36 can be provided for each combustion can 84.

At suitable intervals about the periphery of the manifold 78, there are provided exhaust pipes 96 for venting the spent propellent fluid. The exhaust pipes, if desired, can be connected with a common manifold and led to discharge at the rear of the vehicle in the manner already well known in the art of internal combustion engines.

As the hot gases exit from the drag turbine 12, they pass in heat exchange with the compressed air through the wall 66 of the air compressor 14. If desired, the apertures or ports 64 can be located closer to the axle 40 to enhance the heat exchange effect. Also, if desired, the gas exiting exhaust pipes 96 can be led in heat exchange with the air entering the air compressor through ports 104.

As shown in FIG. 3, the upper wall 100 of the housing 42 is imperforate. But it is to be understood that, if desired, ports corresponding to the apertures 64 can be provided therein for venting spent gases from that side too, in which case the hot gases can be collected in the manifold and passed in heat exchange with the air flowing into the ports 104.

A damper 34 is provided at the bottom of the air compressor for closing off the ports 104. This damper comprises plate 102, having apertures 98 therein coinciding with the inlet ports 104 of the air compressor. An arm 106 projects laterally from the plate 102 which may be connected by suitable linkage to controls for opening and closing the damper 34. If desired, the arm 106 can be functionally connected with the throttling valve 36 so that when the throttling valve 36 is closed the damper will also be closed. Also, the throttling valve 36 can be functionally connected with the clutch mechanism 32 so that when the throttling valve 36 is closed, the clutch mechanism 32 will be thrown out. Alternatively, the throttling valve 36 can be functionally associated with the cutout switch 38 so that when the throttling valve is closed, the circuit between the driven motor-generator 22 and the drive motor-generator 26 is broken.

Suitable bearing means 108 and 110 are provided for centering the rotor 48 in its housing and the air compressor vanes 70 in the air compressor housing. It is important that close tolerances be maintained and bearings constructed as shown for effecting this purpose are indicated.

The spacing between the roughened outer surface 54 of the rotor and the inner smooth surface 46 of the housing 42 is correlated with the diameter of the jet nozzle 60 so that a portion of the jet is directed tangentially into the space between the two apposed surfaces and a portion impinges directly on the roughened outer surface 54. For this purpose the outermost elements 112 of the jet orifice 60 are tangential to the inner surface 46 and the lowermost elements 114 are spaced from the uppermost elements 112 a distance greater than the space between the apposed surfaces. Thus, a portion of the propellant fluid is jetted tangentially into the space between the apposed surfaces and circulates around creating a drag effect. The balance of the jet impinges on the roughened surface and imparts energy thereto by impact or reaction but immediately is sucked into the space between the apposed surfaces and continues the drag effect.

The vent apertures 64 are placed at spaced intervals so that there is at least one aperture for each orifice so that there will be venting of the spent propellant fluids between each of the jet orifices. Thus, the jet fluid will flow into the turbine, spread out over the surface 54 and vent. As many apertures can be provided as consistent with structural mechanics since the gases from one jet orifice 56 will be vented before they reach the gases introduced by the next successive jet orifice so that there will in effect be a continuous flow of spent gases between the rotor 48 and the bottom wall 62 of the housing 42.

It will thus be seen that there is disclosed an efficient and effective power plant comprising a drag turbine, a rotary air compressor and combustion cans for producing and supplying high pressure combustion products to propel the rotor of the drag turbine, whereby a highly efficient flywheel effect is obtained and a flywheel propelled vehicle is provided which can be economically driven on gasoline, diesel fuel, or the like.

It is to be understood that the invention is not to be limited to the exact details of operation or structure shown and described, as obvious modifications and equivalents will be apparent to one skilled in the art.

We claim:

1. In a turbo-flywheel-powered vehicle which comprises:

a gas driven turbine having a rotor;
a combustion can for producing propellant fluid and delivering it to said turbine;
a rotary air compressor mounted to rotate as a unit with said rotor and having conduit means for inducting air into said compressor and conducting compressed air to said combustion can;
drive means for coupling said rotor to the rolling stock of said vehicle; and
a flywheel operatively connected to receive energy from and to deliver energy to said rolling stock; the improvement in which said rotor has a radius of gyration at least as great as that of a solid cylinder and functions as said flywheel and is inside and concentric with a right cylindrical, smooth-surfaced stator and has a roughened outer right cylindrical surface apposed to the smooth concentric right cylindrical inner surface of said stator; in which a plurality of jet orifices are arranged about the periphery of said stator to direct jets of products into the space between said rotor and said stator; and in which the outermost elements of said jet orifices are tangential to said smooth surface of said stator and the lowermost elements of said orifices intercept the roughened surface, whereby a portion of the jet is jetted into the space between the apposed surfaces tangentially to said smooth surface and the balance impinges directly onto the roughened surface of said rotor.

2. A turbo-flywheel-powered vehicle according to claim 1, in which said compressor and said turbine are juxtaposed and having a channel therebetween through which spent propellant is exhausted, whereby said compressor is in heat exchange with spent propellant.

3. A turbo-flywheel-powered vehicle comprising:

a drag turbine having an inner rotor which has a mass distribution such that it functions efficienty as a flywheel and an outer stator having a smooth right cylindrical inner surface opposed to a roughened right cylindrical outer surface on said rotor, a plurality of jet orifices in said stator oriented to jet a portion of propellant fluid into the space between the apposed surfaces and another portion onto the roughened surface of said rotor, and venting means adapted to vent spent propellant fluid laterally between said orifices; means for producing hot propellant fluid under pressure comprising an air compressor; and means for translating rotation of said rotor into motion of said vehicle; said compressor and said turbine being juxtaposed and having a channel therebetween through which spent propellant is exhausted, whereby said compressor is in heat exchange with spent propellant.

4. A turbo-flywheel-powered vehicle, according to claim 3, in which the outermost elements of said jet orifices are tangential to said smooth surface of said stator and the lowermost elements of said orifices intercept the roughened surface, whereby a portion of the jet is jetted into the space between the apposed surfaces tangentially to said smooth surface and the balance impinges directly onto the roughened surface of said rotor.

* * * * *